United States Patent
Li et al.

(10) Patent No.: US 11,871,256 B2
(45) Date of Patent: Jan. 9, 2024

(54) SIGNAL PROCESSING METHOD, DEVICE, AND BASE STATION

(71) Applicant: HUAWEI TECHNOLOGIES CO., LTD., Guangdong (CN)

(72) Inventors: Xiaojie Li, Shenzhen (CN); Qi Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 17/332,529

(22) Filed: May 27, 2021

(65) Prior Publication Data

US 2021/0289378 A1 Sep. 16, 2021

Related U.S. Application Data

(63) Continuation of application No. PCT/CN2019/120674, filed on Nov. 25, 2019.

(30) Foreign Application Priority Data

Nov. 30, 2018 (CN) .......................... 201811458577.1

(51) Int. Cl.
*H04W 24/08* (2009.01)
*H04W 24/10* (2009.01)
*H04W 40/22* (2009.01)

(52) U.S. Cl.
CPC ............ *H04W 24/08* (2013.01); *H04W 24/10* (2013.01); *H04W 40/22* (2013.01)

(58) Field of Classification Search
CPC ... H04W 84/047; H04W 40/22; H04W 24/08; H04W 40/12; H04B 7/2606; H04B 7/024; H04B 7/15592; H04B 7/15528
See application file for complete search history.

(56) References Cited

U.S. PATENT DOCUMENTS

2007/0076684 A1* 4/2007 Lee .................. H04B 7/155 370/335
2008/0009241 A1* 1/2008 Do .................. H04B 7/155 455/9

(Continued)

FOREIGN PATENT DOCUMENTS

| CN | 101166055 A | 4/2008 |
| CN | 101179841 A | 5/2008 |

(Continued)

OTHER PUBLICATIONS

Office Action in Chinese Application No. 201811458577.1, dated Jan. 25, 2021, 22 pages.

(Continued)

*Primary Examiner* — Awet Haile
(74) *Attorney, Agent, or Firm* — Fish & Richardson P.C.

(57) ABSTRACT

A signal processing method includes: obtaining first indication information, where the first indication information includes a measurement parameter; performing, by a signal forwarding device based on the measurement parameter, signal quality measurement on a received first uplink signal sent by a target user terminal UE; sending a signal quality measurement result to a base station; if obtaining second indication information sent by the base station, receiving a second uplink signal sent by the target UE, and forwarding the second uplink signal to the base station, where the second indication information is sent by the base station to the signal forwarding device, after the base station determines, based on the signal quality measurement result, to determine to allocate the target UE to the signal forwarding device as subordinate UE.

18 Claims, 6 Drawing Sheets

(56) References Cited

U.S. PATENT DOCUMENTS

| | | | |
|---|---|---|---|
| 2011/0319012 A1 | 12/2011 | Park et al. | |
| 2012/0083202 A1* | 4/2012 | Sawamoto | H04B 7/15535 |
| | | | 455/7 |
| 2012/0140652 A1* | 6/2012 | Pan | H04B 7/15592 |
| | | | 370/252 |
| 2012/0243462 A1* | 9/2012 | Bucknell | H04B 7/155 |
| | | | 370/315 |
| 2015/0215107 A1 | 7/2015 | Siomina et al. | |
| 2015/0271693 A1 | 9/2015 | Kang et al. | |
| 2016/0037531 A1 | 2/2016 | Lu et al. | |
| 2016/0050578 A1 | 2/2016 | Mondal et al. | |
| 2017/0265187 A1* | 9/2017 | Chen | H04B 7/15507 |
| 2017/0325243 A1* | 11/2017 | Yasukawa | H04L 5/0048 |
| 2018/0309502 A1* | 10/2018 | Khandani | H04B 7/15557 |

FOREIGN PATENT DOCUMENTS

| | | |
|---|---|---|
| CN | 101217301 A | 7/2008 |
| CN | 101378337 A | 3/2009 |
| CN | 101867964 A | 10/2010 |
| CN | 101978739 A | 2/2011 |
| CN | 102291815 A | 12/2011 |
| CN | 105144605 A | 12/2015 |
| CN | 108768472 A | 11/2018 |

OTHER PUBLICATIONS

PCT International Search Report and Written Opinion in International Application No. PCT/CN2019/120674, dated Feb. 19, 2020, 15 pages.

Extended European Search Report issued in European Application No. 19888985.9 dated Dec. 8, 2021, 9 pages.

* cited by examiner

SIGNAL PROCESSING METHOD, DEVICE, AND BASE STATION

CROSS-REFERENCE TO RELATED APPLICATIONS

This application is a continuation of International Application No. PCT/CN2019/120674, filed on Nov. 25, 2019, which claims priority to Chinese Patent Application No. 201811458577.1, filed on Nov. 30, 2018. The disclosures of the aforementioned applications are hereby incorporated by reference in their entireties.

TECHNICAL FIELD

Embodiments of this application relate to the communication field, and in particular, to a signal processing method, a device, and a base station.

BACKGROUND

Edge user experience in long term evolution (LTE), especially user experience in an area with poor coverage, has been a subject that needs to be continuously improved. Therefore, how to support communication in a blind spot area or a hotspot area by using a lowest-cost layout design to provide a higher coverage rate or system throughput rate becomes a problem to be resolved urgently. In the conventional technology, a repeater-based communication manner provides a good solution for such a problem with its flexible deployment and relatively low costs.

A conventional repeater is an intra-frequency amplification device, which is a radio transmission relay device that enhances signal strength during wireless communication transmission. A basic function of the repeater is to enhance power of a radio frequency signal. The repeater is one of the necessary means to achieve a goal of "small size and large coverage". Main reasons are as follows: First, the repeater is used to ensure network coverage without increasing a quantity of base stations. Second, costs of the repeater are far lower than those of micro cellular systems with the same effect. The repeater is a preferred solution to extend coverage of a communication network. Compared with a base station, the repeater has advantages of simple structure, low investment, and easy installation, and can be widely used in blind areas and weak coverage areas that are difficult to be covered, such as shopping malls, hotels, airports, wharfs, stations, stadiums, entertainment halls, subways, tunnels, highways, and islands, to improve communication quality, resolve a call drop problem, and optimize a wireless communication network.

However, a conventional repeater transparently transmits corresponding uplink/downlink signals. Therefore, it has the following disadvantages:

(1) All uplink signals are amplified, causing signal interference and affecting quality of signals received by the base station.

(2) Because the repeater performs transparent transmission, the base station cannot identify specific user equipment (UE) processed by the repeater, and cannot accurately monitor the UE. Consequently, a statistical result of traffic, of some UEs, that is collected by the base station is inaccurate, and signal quality is affected.

SUMMARY

This application provides a signal processing method, a device, and a base station, to avoid, to some extent, a problem that system performance and signal quality are affected because the base station does not comprehensively monitor UE and amplifies all uplink signals.

To achieve the foregoing objectives, the following technical solutions are used in this application:

According to a first aspect, an embodiment of this application provides a signal processing method, where the method includes: A signal forwarding device obtains first indication information, where the first indication information includes a measurement parameter; then the signal forwarding device may perform, based on the obtained measurement parameter, signal quality measurement on a received first uplink signal sent by a target user terminal UE; and subsequently, the signal forwarding device sends a signal quality measurement result to a base station; if obtaining second indication information sent by the base station, the signal forwarding device further receives a second uplink signal sent by the target UE, and forwards the second uplink signal to the base station, where the second indication information is sent by the base station to the signal forwarding device, after the base station determines, based on the signal quality measurement result to allocate the target UE to the signal forwarding device as subordinate UE.

In the foregoing manner, the base station can selectively allocate corresponding UE to the signal forwarding device, and the signal forwarding device processes only an uplink signal of the UE allocated by the base station to the signal forwarding device, so that signal interference is effectively reduced, thereby improving signal quality and overall performance of a system.

In a possible implementation, the first indication information or the second indication information is included in a first downlink channel between the base station and the signal forwarding device.

In the foregoing manner, the base station may directly send the first indication information or the second indication information to the signal forwarding device through the downlink channel between the base station and the signal forwarding device.

In a possible implementation, the second indication information is included in a second downlink channel between the base station and the target UE, and a method for obtaining the first indication information or the second indication information by the signal forwarding device is: monitoring the second downlink channel based on third indication information sent by the base station, to obtain the second indication information, where the third indication information carries identification information used to indicate the second downlink channel.

In the foregoing manner, the signal forwarding device can obtain the second indication information by monitoring the downlink channel of the target UE.

In a possible implementation, the second indication information includes a reception control parameter, and the reception control parameter is used to indicate the signal forwarding device to identify and obtain the second uplink signal.

In the foregoing manner, the signal forwarding device can obtain the uplink signal of the target UE based on the reception control parameter.

In a possible implementation, the method may further include: The signal forwarding device receives all downlink signals sent by the base station; the signal forwarding device amplifies all downlink signals; and the signal forwarding device forwards the amplified downlink signals.

In the foregoing manner, the downlink signals of the base station are transparently transmitted, thereby improving signal quality in a weak coverage area.

In a possible implementation, the method may further include: The signal forwarding device obtains fourth indication information, where the fourth indication information includes a transmit parameter; and correspondingly, the step of forwarding the second uplink signal to the base station may specifically include: The signal forwarding device transmits the second uplink signal to the base station based on the transmit parameter.

In the foregoing manner, the signal forwarding device can transmit a signal to the base station in a manner specified by the base station.

According to a second aspect, an embodiment of this application provides a signal processing method, where the method includes: A base station sends first indication information to a first signal forwarding device, where the first indication information includes a measurement parameter; the base station receives a first signal quality measurement result sent by the first signal forwarding device, where the signal quality measurement result is sent by the first signal forwarding device after the first signal forwarding device performs, based on the measurement parameter, signal quality measurement on a received first uplink signal sent by a target user terminal UE; the base station obtains the first uplink signal, and performs signal quality measurement on the first uplink signal to obtain a second signal quality measurement result; and the base station determines, based on the first signal quality measurement result and the second signal quality measurement result, whether to allocate the target UE to the first signal forwarding device as subordinate UE; if determining to allocate the target UE to the first signal forwarding device as the subordinate UE, the base station sends second indication information to the first signal forwarding device, where the second indication information is used to indicate the first signal forwarding device to further receive a second uplink signal sent by the target UE; and the base station receives the second uplink signal sent by the first signal forwarding device.

In a possible implementation, the step of sending first indication information to a first signal forwarding device further includes: The base station sends the first indication information to at least one second signal forwarding device; and correspondingly, the method further includes: The base station receives a third signal quality measurement result sent by each second signal forwarding device in the at least one second signal forwarding device; and determines, based on the first signal quality measurement result, the second signal quality measurement result, and the third signal quality measurement result, whether to allocate the target UE to the first signal forwarding device as the subordinate UE.

In a possible implementation, the first indication information or the second indication information is included in a first downlink channel between the base station and the first signal forwarding device.

In a possible implementation, the step of sending second indication information to the first signal forwarding device specifically includes: The base station sends third indication information to the first signal forwarding device, where the third indication information is used to indicate the first signal forwarding device to monitor a second downlink channel between the base station and the target UE, and obtain the second indication information included in the second downlink channel.

In a possible implementation, the second indication information includes a reception control parameter, and the reception control parameter is used to indicate the first signal forwarding device to identify and obtain the second uplink signal.

In a possible implementation, the method further includes: The base station sends fourth indication information to the first signal forwarding device, where the fourth indication information includes a transmit parameter, and the transmit parameter is used to indicate the first signal forwarding device to transmit the second uplink signal to the base station based on the transmit parameter.

According to a third aspect, an embodiment of this application provides a signal forwarding device. The device may include: an obtaining module, configured to obtain first indication information, where the first indication information includes a measurement parameter; a measurement module, configured to perform, based on the measurement parameter, signal quality measurement on a received first uplink signal sent by a target user terminal UE; a sending module, configured to send a signal quality measurement result to a base station; and an uplink signal processing module, configured to: if obtaining second indication information sent by the base station, further receive a second uplink signal sent by the target UE, and forward the second uplink signal to the base station, where the second indication information is sent by the base station to the signal forwarding device, after the base station determines, based on the signal quality measurement result, to allocate the target UE to the signal forwarding device as subordinate UE.

In a possible implementation, the first indication information or the second indication information is included in a first downlink channel between the base station and the signal forwarding device.

In a possible implementation, the second indication information is included in a second downlink channel between the base station and the target UE, and the obtaining module is specifically configured to: monitor the second downlink channel based on third indication information sent by the base station, to obtain the second indication information, where the third indication information carries identification information used to indicate the second downlink channel.

In a possible implementation, the second indication information includes a reception control parameter, and the reception control parameter is used to indicate the signal forwarding device to identify and obtain the second uplink signal.

In a possible implementation, the device further includes a downlink signal processing module, configured to receive all downlink signals sent by the base station; amplify all the downlink signals; and forward the amplified downlink signals.

In a possible implementation, the obtaining module is further configured to obtain fourth indication information, where the fourth indication information includes a transmit parameter; and correspondingly, the sending module is further configured to transmit the second uplink signal to the base station based on the transmit parameter.

According to a fourth aspect, an embodiment of this application provides a base station, including: a first sending module, configured to send first indication information to a first signal forwarding device, where the first indication information includes a measurement parameter; a first receiving module, configured to receive a first signal quality measurement result sent by the first signal forwarding device, where the first signal quality measurement result is sent by the first signal forwarding device after the first signal forwarding device performs, based on the measurement parameter, signal quality measurement on a received first uplink signal sent by a target user terminal UE; an obtaining module, configured to obtain the first uplink signal, and perform signal quality measurement on the first uplink signal to obtain a second signal quality measurement result; a determining module, configured to determine, based on the first signal quality measurement result and the second signal quality measurement result, whether to allocate the target UE to the first signal forwarding device as subordinate UE; a second sending module, configured to: if it is determined that the target UE is allocated to the first signal forwarding device as the subordinate UE, send second indication information to the first signal forwarding device, where the second indication information is used to indicate the first signal forwarding device to further receive a second uplink signal sent by the target UE; and a second receiving module, configured to receive the second uplink signal sent by the first signal forwarding device.

In a possible implementation, the first sending module is further configured to send the first indication information to at least one second signal forwarding device; and correspondingly, the receiving module is further configured to receive a third signal quality measurement result sent by each second signal forwarding device in the at least one second signal forwarding device; and the determining module is further configured to determine, based on the first signal quality measurement result, the second signal quality measurement result, and the third signal quality measurement result, whether to allocate the target UE to the first signal forwarding device as the subordinate UE.

In a possible implementation, the first indication information or the second indication information is included in a first downlink channel between the base station and the first signal forwarding device.

In a possible implementation, the step of sending second indication information to the first signal forwarding device specifically includes: sending third indication information to the first signal forwarding device, where the third indication information is used to indicate the first signal forwarding device to monitor a second downlink channel between the base station and the target UE, and obtain the second indication information included in the second downlink channel.

In a possible implementation, the second indication information includes a reception control parameter, and the reception control parameter is used to indicate the first signal forwarding device to identify and obtain the second uplink signal.

In a possible implementation, the base station further includes a third sending module, configured to send fourth indication information to the first signal forwarding device, where the fourth indication information includes a transmit parameter, and the transmit parameter is used to indicate the first signal forwarding device to transmit the second uplink signal to the base station based on the transmit parameter.

According to a fifth aspect, an embodiment of this application provides a signal forwarding device, including a transceiver/a transceiver pin and a processor, and optionally, further including a memory. The transceiver/transceiver pin, the processor, and the memory communicate with each other through an internal connection path. The processor is configured to execute instructions to control the transceiver/transceiver pin to send or receive a signal. The memory is configured to store the instructions. When the processor executes the instructions, the processor performs the method according to any one of the first aspect or the possible implementations of the first aspect.

According to a sixth aspect, an embodiment of this application provides a base station, including a transceiver/transceiver pin and a processor, and optionally, further including a memory. The transceiver/transceiver pin, the processor, and the memory communicate with each other through an internal connection path. The processor is configured to execute instructions to control the transceiver/transceiver pin to send or receive a signal. The memory is configured to store the instructions. When the processor executes the instructions, the processor performs the method according to any one of the second aspect or the possible implementations of the second aspect.

According to a seventh aspect, an embodiment of this application provides a computer-readable medium, configured to store a computer program. The computer program includes instructions used to perform the method according to any one of the first aspect or the possible implementations of the first aspect.

According to an eighth aspect, an embodiment of this application provides a computer-readable medium, configured to store a computer program. The computer program includes instructions used to perform the method according to any one of the second aspect or the possible implementations of the second aspect.

According to a ninth aspect, an embodiment of this application provides a computer program. The computer program includes instructions used to perform the method according to any one of the first aspect or the possible implementations of the first aspect.

According to a tenth aspect an embodiment of this application provides a computer program. The computer program includes instructions used to perform the method according to any one of the second aspect or the possible implementations of the second aspect.

According to an eleventh aspect, an embodiment of this application provides a chip. The chip includes a processing circuit and a transceiver pin. The transceiver pin and the processor communicate with each other through an internal connection path. The processor performs the method according to any one of the first aspect or the possible implementations of the first aspect, to control a receive pin to receive a signal, and to control a transmit pin to send a signal.

According to a twelfth aspect, an embodiment of this application provides a chip. The chip includes a processing circuit and a transceiver pin. The transceiver pin and the processor communicate with each other through an internal connection path. The processor performs the method according to any one of the second aspect or the possible implementations of the second aspect, to control a receive pin to receive a signal, and control a transmit pin to send a signal.

According to a thirteenth aspect, an embodiment of this application provides a signal processing system. The system includes the signal forwarding device and the base station in the first aspect and the second aspect.

BRIEF DESCRIPTION OF DRAWINGS

To describe technical solutions in embodiments of this application more clearly, the following briefly describes the accompanying drawings required for describing the embodiments of this application. Clearly, the accompanying drawings in the following descriptions show merely some embodiments of this application, and a person of ordinary skill in the art may still derive other drawings from these accompanying drawings without creative efforts.

DESCRIPTION OF EMBODIMENTS

The following clearly and completely describes technical solutions in embodiments of this application with reference to the accompanying drawings in the embodiments of this application. Clearly, the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and the like are intended to distinguish between different objects but do not describe a particular order of the objects. For example, a first target object, a second target object, and the like are used to distinguish between different target objects, but are not used to describe a specific order of the target objects.

In the embodiments of this application, the word such as "example" or "for example" is used to give an example, an illustration, or a description. Any embodiment or design scheme described as the word "example" or "for example" in the embodiments of this application should not be explained as being more preferred or having more advantages than another embodiment or design scheme. Exactly, use of the term such as "example" or "for example" is intended to present a relative concept in a specific manner.

In descriptions of the embodiments of this application, unless otherwise stated, "a plurality of" means two or more. For example, a plurality of processing units are two or more processing units; and a plurality of systems are two or more systems.

Figure 1:
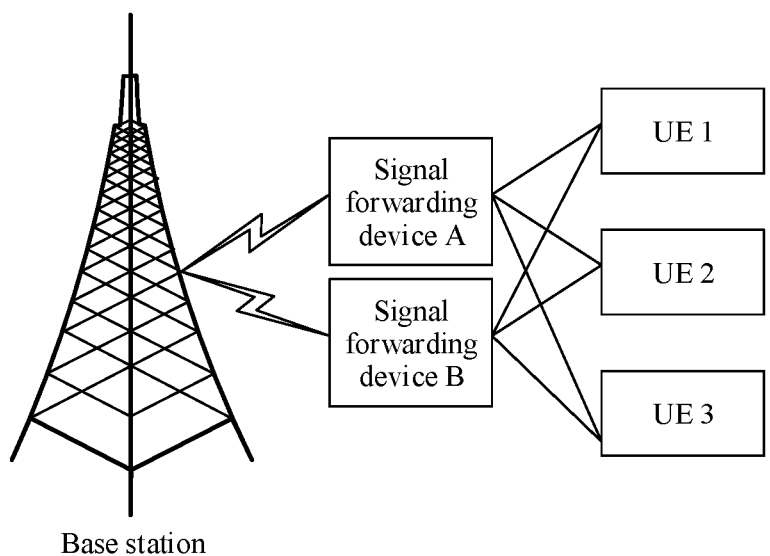
FIG. 1 is a schematic diagram of an application scenario according to an embodiment of this application.

Before the technical solutions in the embodiments of this application are described, an application scenario of the embodiments of this application is first described with reference to the accompanying drawings. FIG. 1 is a schematic diagram of an application scenario according to an embodiment of this application. The application scenario includes a base station, a signal forwarding device A, a signal forwarding device B, and UE 1 to UE 3 (which are respectively UE 1, UE 2, and UE 3). In a specific implementation process of this embodiment of this application, UE may be a device such as a computer, a smartphone, a telephone set, a cable television set-top box, or a digital subscriber line router. It should be noted that in actual application, there may be one or more signal forwarding devices and UEs. Quantities of the base station, the signal forwarding devices, and the UEs in the application scenario shown in FIG. 1 are merely examples of adaptability. This is not limited in this application.

The foregoing application scenario may be used to support a fourth generation (4G) access technology, for example, a long term evolution (LTE) access technology; the application scenario may support a fifth generation (5G) access technology, for example, a new radio (NR) access technology; the application scenario may be used to support a third generation (3G) access technology, for example, a universal mobile telecommunications system, UMTS access technology; the application scenario may be used to support a second generation (2G) access technology, for example, a global system for mobile communications (GSM) access technology; or the application scenario may be used in a communication system that supports a plurality of wireless technologies, for example, supports an LTE technology and an NR technology. In addition, the application scenario may be applicable to a future-oriented communication technology.

In addition, the base station in FIG. 1 may be configured to support terminal access, for example, may be a base transceiver station (BTS) and a base station controller (BSC) in a 2G access technology communication system, a NodeB and a radio network controller (RNC) in a 3G access technology communication system, and an evolved NodeB (eNB) in a 4G access technology communication system, a next generation NodeB (gNB), a transmission reception point (TRP), a relay node, an access point (AP), and the like in a 5G access technology communication system.

The UE in FIG. 1 may be a device that provides voice or data connectivity for a user, for example, may also be referred to as a mobile station, a subscriber unit, a station, or terminal equipment (TE). The UE may be a cellular phone, a personal digital assistant (PDA), a wireless modem, a handheld device, a laptop computer, a cordless phone, a wireless local loop (WLL) station, a pad, and the like. With development of wireless communication technologies, any device that can access a wireless communication network communicate with a network side of a communication system, or communicate with another object over a communication network may be the terminal in the embodiments of this application, such as a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register. In this embodiment of this application, the terminal may communicate with the signal forwarding device, for example, the signal forwarding device A or the signal forwarding device B, or may communicate with the base station. A plurality of terminals may also communicate with each other. The terminal may be static and fixed or mobile.

Figure 2A:
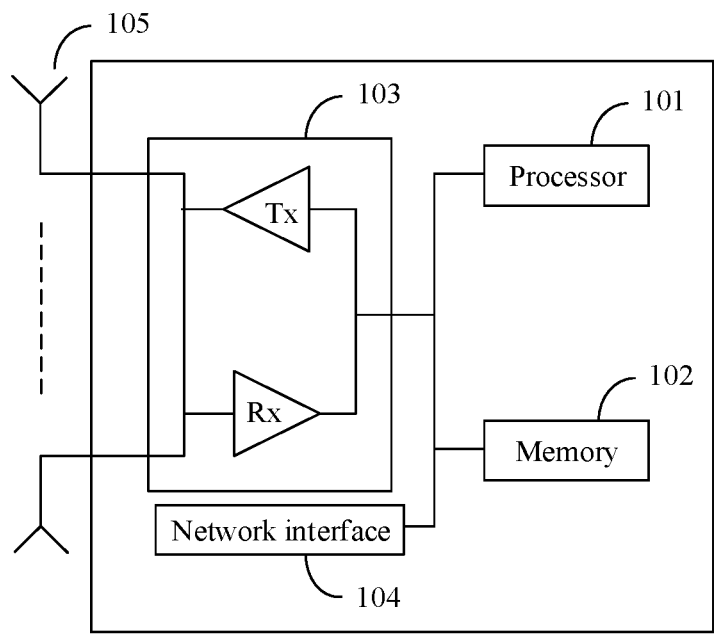
FIG. 2a is a schematic structural diagram of a base station according to an embodiment of this application.

FIG. 2a is a schematic structural diagram of a base station. In FIG. 2a:

The base station includes at least one processor 101, at least one memory 102, at least one transceiver 103, at least one network interface 104, and one or more antennas 105. The processor 101, the memory 102, the transceiver 103, and the network interface 104 are connected, for example, by using a bus. The antenna 105 is connected to the transceiver 103. The network interface 104 is configured to enable the base station to be connected to another communication device through a communication link. In the embodiments of this application, the connection may include various types of interfaces, transmission lines, buses, or the like. This is not limited in the embodiments.

In the embodiments of this application, the processor such as the processor 101 may include at least one of the following types: a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 101 may be a single-core (single-CPU) processor or a multi-core (multi-CPU) processor. The at least one processor 101 may be integrated into one chip or located on a plurality of different chips.

In the embodiments of this application, the memory such as the memory 102 may include at least one of the following types: a read-only memory (ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

The memory 102 may exist independently, and is connected to the processor 101. Optionally, the memory 102 may alternatively be integrated with the processor 101, for example, integrated into one chip. The memory 102 can store program code for executing the technical solutions in the embodiments of this application, and the processor 101 controls execution of the program code. Various types of computer program code that are executed may be considered as a driver of the processor 101. For example, the processor 101 is configured to execute the computer program code stored in the memory 102, to implement the technical solutions in the embodiments of this application.

The transceiver 103 may be configured to support receiving or sending of a radio frequency signal between an access network device and a terminal, and the transceiver 103 may be connected to the antenna 105. The transceiver 103 includes a transmitter Tx and a receiver Rx. Specifically, the one or more antennas 105 may receive the radio frequency signal. The receiver Rx of the transceiver 103 is configured to: receive the radio frequency signal from the antenna, convert the radio frequency signal into a digital baseband signal or a digital intermediate frequency signal, and provide the digital baseband signal or the digital intermediate frequency signal for the processor 101, so that the processor 101 further processes the digital baseband signal or the digital intermediate frequency signal, for example, performs demodulation processing and decoding processing. In addition, the transmitter Tx of the transceiver 103 is further configured to: receive a modulated digital baseband signal or digital intermediate frequency signal from the processor 101, convert the modulated digital baseband signal or digital intermediate frequency signal into a radio frequency signal, and send the radio frequency signal through the one or more antennas 105. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

Figure 2B:
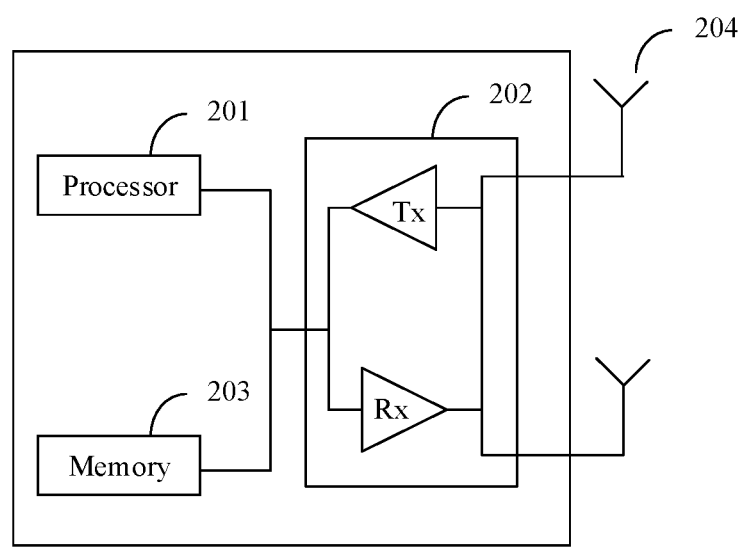
FIG. 2b is a schematic structural diagram of a signal forwarding device according to an embodiment of this application.

FIG. 2b is a schematic structural diagram of a signal forwarding device according to an embodiment of this application. In FIG. 2b:

The signal forwarding device includes at least one processor 201, at least one transceiver 202, and at least one memory 203. The processor 201, the memory 203, and the transceiver 202 are connected. Optionally, the signal forwarding device 200 may further include one or more antennas 204. The antenna 204 is connected to the transceiver 202.

The transceiver 202, the memory 203, and the antenna 204 may implement similar functions with reference to the related descriptions in FIG. 2a.

The processor 201 may be a baseband processor or a CPU, and the baseband processor and the CPU may be integrated or separated.

The processor 201 may be configured to implement various functions for the signal forwarding device, for example, configured to process a communication protocol and communication data, or configured to control an entire signal forwarding device, execute a software program, and process data of the software program. Alternatively, the processor 201 is configured to implement one or more of the foregoing functions.

Based on the base station, the signal forwarding devices, and the terminal in the foregoing application scenario, the embodiments of this application provide a signal processing solution that can reduce signal interference and improve overall system performance. In this solution, the base station sends first indication information to the signal forwarding device, to indicate the signal forwarding device to perform signal quality measurement on an uplink signal of target UE based on a measurement parameter included in the first indication information. After performing signal quality measurement on the target UE, the signal forwarding device sends a signal quality measurement result to the base station. Then the base station may perform selection based on received signal quality measurement results that are sent by one or more signal forwarding devices and that are for same target UE and a result of performing signal quality measurement on the uplink signal of the target UE by the base station, to determine an access device for the target UE. The access device is configured to process a subsequent uplink signal (that is, a second uplink signal in this embodiment of this application) of the target UE. The access device may be the base station, or may be the signal forwarding device A or the signal forwarding device B. If the access device is the signal forwarding device A or the signal forwarding device B, the base station sends second indication information to the signal forwarding device A or the signal forwarding device B, to indicate the signal forwarding device A or the signal forwarding device B to receive the second uplink signal of the target UE and forward the second uplink signal to the base station.

In an embodiment of this application, the target UE may be classified into three types. One type is new UE, that is, this type of UE has not accessed the base station by using the signal forwarding device, nor directly accesses the base station. A second type is UE that accesses the base station by using the signal forwarding device, that is, based on the signal quality measurement result, the base station determines to allocate the UE to the signal forwarding device A or the signal forwarding device B as subordinate UE. A third type is UE that directly accesses the base station, that is, the UE whose uplink signal is directly processed by the base station without using any signal forwarding device.

Optionally, based on three different types of UEs, the base station triggers the signal forwarding device to perform different signal quality measurement for different types of UEs.

Optionally, in an embodiment, for the first type: the new UE, the base station may send, to the signal forwarding device during initial setting or when a configuration of the base station is changed (which means that a configuration for receiving access requests of all UEs by the base station is changed), the first indication information that carries the measurement parameter. The signal forwarding device may perform, based on the measurement parameter, signal quality measurement on a received access request sent by the new UE. The measurement parameter includes but is not limited to related information (for example, location information) of a physical random access channel (PRACH). In other words, the signal forwarding device may receive, based on the related information of the PRACH, the access request sent by the new UE. Then, the signal forwarding device may perform signal quality measurement on the access request based on the PRACH.

Optionally, in another embodiment, for the second type: the UE that accesses the base station by using the signal forwarding device, the base station may directly send, to the signal forwarding device, measurement parameters of all target UEs (for example, the UE 1 to the UE 3) that require the signal forwarding device to perform the signal quality measurement. The measurement parameter includes but is not limited to related information of a sounding reference signal (SRS) and/or a demodulation reference signal (DMRS). That is, the signal forwarding device may receive, based on the measurement parameter, an uplink signal sent by the target UE, and perform signal quality measurement on the uplink signal. Optionally, for this type of UE, the signal forwarding device periodically triggers the signal quality measurement for this type of UE. Specifically, after the base station allocates the target UE to the signal forwarding device, the signal forwarding device stores identification information of this type of UE and the measurement parameter. Then, the base station may notify the signal forwarding device of a measurement periodicity, for example: 20 min. In this case, the signal forwarding device performs the signal quality measurement for the target UE based on the measurement parameter at a periodic trigger moment, that is, every 20 minutes. In an embodiment, alternatively, the base station may indicate, at the periodic trigger moment, the signal forwarding device to perform the signal quality measurement for the target UE. That is, the base station sends the first indication information to the signal forwarding device at the periodic trigger moment.

Optionally, in still another embodiment, for the third type: the UE that directly accesses the base station, the measurement parameter carried in the first indication information sent by the base station to the signal forwarding device is the same as that used in the second type, that is, the information about the SRS and/or the DMRS may be carried. An occasion for the signal forwarding device to perform the signal quality measurement for this type of UE may be periodic. That is, a method used for this type is the same as that used for the second type, including: The base station indicates, at the periodic trigger moment, the signal forwarding device to perform the signal quality measurement for the target UE, or the base station indicates the signal forwarding device to periodically measure the target UE. Optionally, a measurement periodicity corresponding to the third type of UE may be longer than a measurement periodicity corresponding to the second type of UE, to reduce device load on the signal forwarding device. In an embodiment, alternatively, an occasion for triggering the signal forwarding device to perform the signal quality measurement for this type of UE may be as follows: When the base station detects that signal quality of UE that accesses the base station deteriorates (the base station performs signal quality measurement periodically or each time when receiving an uplink signal), the base station may indicate the signal forwarding device to perform the signal quality test for the UE.

It should be noted that for the foregoing three types of UE, when indicating the signal forwarding device to perform the signal quality test on the uplink signal of the UE, the base station may notify all signal forwarding devices that perform communication connection with the base station, or may notify only some signal forwarding devices. This is not limited in this application.

Optionally, the signal quality measurement may be: measuring signal strength of an uplink signal based on the measurement parameter. Alternatively, the signal quality measurement may be: measuring a signal-to-noise ratio of an uplink signal based on the measurement parameter, or measuring any other value that may be used to indicate quality of an uplink signal. In addition, the signal quality measurement may be a combination of a plurality of measurement manners. This is not limited in the embodiments of this application.

The following describes in detail signal processing processes of the foregoing three types of UEs with reference to the accompanying drawings.

Figure 3:
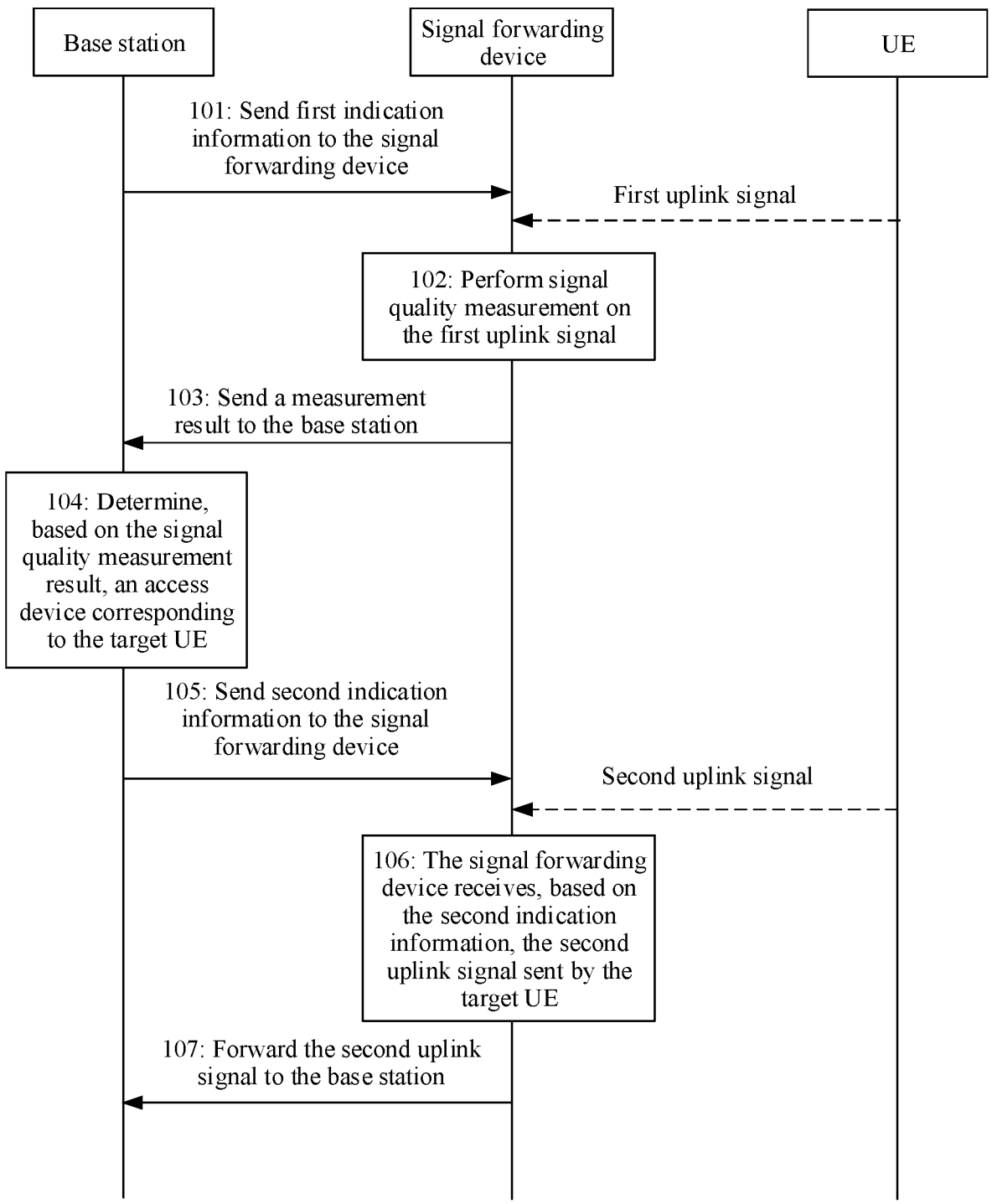
FIG. 3 is a first flowchart of a signal processing method according to an embodiment of this application.

FIG. 3 is a schematic flowchart of a signal processing method according to an embodiment of this application. This embodiment is mainly used to describe in detail a signal processing process of the foregoing first type: the new UE. In FIG. 3:

Step 101: A base station sends first indication information to a signal forwarding device.

Specifically, in this embodiment of this application, the base station may send the first indication information to the signal forwarding device, to indicate the signal forwarding device to perform signal quality measurement on an uplink signal of target UE based on a measurement parameter carried in the first indication information.

With reference to FIG. 1, in this embodiment, the base station may send, to the signal forwarding device A and the signal forwarding device B during initial setting (initial setting of the base station or initial setting of any signal forwarding device), the first indication information that carries the measurement parameter. In this embodiment, the measurement parameter includes but is not limited to a PRACH and related information thereof. The signal forwarding device A and the signal forwarding device B may separately monitor downlink channels between the signal forwarding device A and the signal forwarding device B and the base station based on identification information of the signal forwarding device A and the signal forwarding device B, to obtain the first indication information. In an embodiment, the base station may alternatively trigger a sending procedure of the first indication information after a configuration of the base station is updated or a configuration of any signal forwarding device is updated.

Then, the signal forwarding device A and the signal forwarding device B store the measurement parameter in a local memory. It should be noted that a measurement parameter of an access request is applicable to access requests of all UEs. Therefore, before updating, the base station only needs to send the measurement parameter corresponding to the access request once.

In an embodiment, the base station may further send fourth indication information to the signal forwarding device at an initial setting stage or after the device is updated. The fourth indication information may carry a transmit parameter used to indicate the signal forwarding device to send a signal. The transmit parameter includes but is not limited to related information of a transmission resource that can be used by the signal forwarding device, power control information, and the like.

Step 102: The signal forwarding device receives a first uplink signal of the target UE based on the measurement parameter, and performs signal quality measurement on the first uplink signal.

Specifically, in this embodiment, after receiving the measurement parameter, the signal forwarding device may receive the uplink signal sent by the target UE. In this embodiment, the uplink signal is an access request. It should be noted that the target UE in this embodiment means all UEs within coverage of the signal forwarding device, that is, the UEs within signal coverage of the signal forwarding device, and the signal forwarding device may receive the access request sent by the UE.

With reference to FIG. 1, an example in which UE 1 is newly accessed UE is used for detailed description. Assuming that the UE 1 is in signal coverage of the signal forwarding device A and the signal forwarding device B, both the signal forwarding device A and the signal forwarding device B may obtain an access request sent by the UE 1. Then, the signal forwarding device A and the signal forwarding device B perform signal quality measurement on the access request based on the locally stored measurement parameter.

Step 103: The signal forwarding device sends a measurement result to the base station.

Specifically, the signal forwarding device may send the measurement result to the base station based on the transmit parameter. With reference to FIG. 1, that is, each of the signal forwarding device A and the signal forwarding device B sends a signal quality measurement result to the base station based on the transmit parameter.

Step 104: The base station determines, based on the signal quality measurement result, an access device corresponding to the target UE.

Specifically, in this embodiment of this application, in an embodiment, the access device may be the base station. In another embodiment, the access device may be the signal forwarding device A or the signal forwarding device B. The base station selects the access device based on the signal quality measurement result.

Specifically, in this embodiment of this application, the base station also performs signal quality measurement on the uplink signal of the target UE. With reference to FIG. 1, the base station performs signal quality measurement on the access request sent by the UE 1. In an embodiment, if the base station cannot receive the access request sent by the UE 1 (that is, the UE 1 is in the signal coverage of the signal forwarding device A and the signal forwarding device B, but does not belong to the signal coverage of the base station), a measurement result of the base station for the access request of the UE 1 in this case is 0.

Still referring to FIG. 1, the base station selects a corresponding access device for the UE 1 based on the received signal quality measurement results that are sent by at least one signal forwarding device (the signal forwarding device A and the signal forwarding device B) and that correspond to the access request of the UE 1, and a result of the signal quality measurement performed by the base station for the UE 1.

In this embodiment of this application, the selection rule includes but is not limited to:

(1) A device with an optimal signal quality measurement result is selected as the access device.

(2) Selection is performed based on a threshold. For example, if a measurement result of the base station is lower than a first threshold, and a measurement result of the signal forwarding device A is higher than a second threshold, the signal forwarding device A is selected as the access device.

(3) Selection is performed based on a difference of measurement results. For example, if a difference between a measurement result of the base station and a measurement result of the signal forwarding device A is less than a threshold (which may be set according to an actual situation), the access device is the base station; otherwise, the access device is the signal forwarding device A.

If the base station selects the signal forwarding device A or the signal forwarding device B as the access device, step 105 is performed. If the base station selects the base station as the access device, subsequent signal processing steps are performed in a signal processing manner according to existing technologies. Details are not described in this application.

Step 105: The base station sends second indication information to the signal forwarding device.

Specifically, in this embodiment of this application, the base station allocates the target UE to the signal forwarding device as subordinate UE of the signal forwarding device (that is, selects the signal forwarding device as the access device of the target UE). In this case, the base station sends the second indication information to the signal forwarding device, where the second indication information is used to indicate the signal forwarding device to obtain an uplink signal (that is, a second uplink signal in this embodiment of this application) subsequently sent by the target UE. With reference to FIG. 1, if the base station allocates the UE 1 to the signal forwarding device A as subordinate UE, the base station sends the second indication information to the signal forwarding device A, to indicate the signal forwarding device A to identify and obtain another uplink signal sent by the UE 1.

In this embodiment of this application, manners in which the base station sends the second indication information to the UE 1 include but are not limited to the following two manners:

Manner (1): The second indication information may be directly sent by the base station to the signal forwarding device. Specifically, the base station may send, to the signal forwarding device through a downlink channel between the base station and the signal forwarding device, identification information corresponding to each subordinate UE in at least one subordinate UE allocated to the signal forwarding device. With reference to FIG. 1, for example, after the base station allocates the UE 1 to the signal forwarding device A, the base station may send the second indication information to the signal forwarding device A through a downlink channel between the base station and the signal forwarding device A. The second indication information carries a reception control parameter. The reception control parameter is further included in a downlink signal sent by the base station to the UE 1. In this embodiment, reception control information included in the downlink signal is used to indicate the UE 1 to perform next uplink signal transmission based on the reception control parameter. Therefore, after obtaining the reception control parameter, the signal forwarding device may identify and obtain the uplink signal in the next transmission performed by the UE 1. It should be noted that a parameter (that is, the reception control parameter in this embodiment of this application) that is sent by the base station to the UE 1 each time and that is used to indicate the UE 1 to perform next uplink transmission may be different. Therefore, each time the base station sends, to the UE 1, a downlink signal that carries the reception control parameter, the base station sends a new reception control parameter to the signal forwarding device A, to enable the signal forwarding device A to update the locally stored reception control parameter that is of the uplink signal and that corresponds to the UE 1.

In an optional manner, the reception control parameter includes but is not limited to information such as a resource usage status (for example, a resource block (RB) location) of the second uplink signal of the UE 1 and a modulation and coding scheme (MCS) that may be used to indicate the signal forwarding device A to successfully identify and obtain the second uplink signal of the UE 1.

The signal forwarding device A may monitor, based on identification information of the signal forwarding device A, the downlink channel (that is, the downlink channel between the base station and the signal forwarding device A) that belongs to the signal forwarding device A, and obtain the second indication information from the downlink channel.

Manner (2): The second indication information may be included in a downlink channel between the base station and the target UE. Specifically, after allocating the target UE to the signal forwarding device, the base station may send third indication information to the signal forwarding device through a downlink channel between the base station and the signal forwarding device. The third indication information carries downlink channel identification information of the target UE. The signal forwarding device may monitor the downlink channel of the target UE based on the downlink channel identification information. Then, the base station may send a downlink signal to the target UE. The downlink signal is carried on the downlink channel between the base station and the target UE, and the downlink signal carries related indication information (for example, an RB location) used to indicate the target UE to send an uplink signal next time. This type of indication information is the second indication information in this embodiment of this application, that is, the second indication information is included in the downlink signal. In addition, the signal forwarding device may obtain, by monitoring the downlink channel, the second indication information carried in the downlink signal. With reference to FIG. 1, for example, after allocating the UE 1 to the signal forwarding device A, the base station sends, to the signal forwarding device A, the third indication information that carries downlink channel identification information of the UE 1, to indicate the signal forwarding device A to monitor a downlink channel between the base station and the UE 1. Then, the base station may send a downlink signal to the UE 1 through the downlink channel between the base station and the UE 1. The downlink signal carries the second indication information (including the reception control parameter). Then, when monitoring the downlink signal, the signal forwarding device A may obtain the reception control parameter included in the downlink signal.

Step 106: The signal forwarding device receives, based on the second indication information, the second uplink signal sent by the target UE.

Specifically, in this embodiment of this application, after obtaining the second indication information, the signal forwarding device stores the second indication information in a local memory. Optionally, as described above, the second indication information delivered by the base station each time may be different. Therefore, each time the signal forwarding device receives new second indication information, the signal forwarding device updates the previously received second indication information.

Then, the signal forwarding device may identify and obtain, based on the obtained second indication information, the uplink signal sent by the target UE next time, that is, the second uplink signal in this embodiment of this application.

With reference to FIG. 1, for example, the signal forwarding device A stores the obtained reception control parameter in the local memory, and in addition, the UE 1 also receives a downlink signal that includes the reception control parameter and that is delivered by the base station. Then, the UE 1 sends the second uplink signal to the base station based on an indication of the reception control parameter. For example, the downlink signal includes redundancy version (RV) information and RB location information. When transmitting the second uplink signal, the UE 1 sends the second uplink signal based on the RB location and the RV information that are indicated by the base station. In addition, the signal forwarding device A may obtain the second uplink signal from the uplink channel of the UE 1 by identifying the RB location, the RV information, and the like.

Optionally, the step of obtaining the second uplink signal by the signal forwarding device A may further include: The signal forwarding device A measures the second uplink signal, to obtain a measurement value such as a signal-to-noise ratio of the second uplink signal. The measurement value is used to indicate the base station to evaluate the uplink channel. In addition, the signal forwarding device A performs processing such as demodulation and decoding on the second uplink signal, to obtain a decoded second uplink signal. Optionally, the signal forwarding device A may perform noise reduction processing on another uplink signal other than the second uplink signal on the transmission resource, for example, set the another uplink signal to zero. For specific details of obtaining the second uplink signal, refer to a technical solution of a repeater in the existing technologies. Details are not described in this application.

Step 107: The signal forwarding device forwards the second uplink signal to the base station.

Specifically, in this embodiment of this application, after receiving the second uplink signal, the signal forwarding device amplifies the second uplink signal. With reference to FIG. 1, for example, the signal forwarding device A may combine received second uplink signals sent by a plurality of subordinate UEs including UE 1, perform link-level adjustment such as coding and modulation on the combined signals, and send the processed second uplink signals to the base station based on the transmit parameter indicated in step 101.

In an optional manner, the signal forwarding device A may combine uplink signals of the plurality of subordinate UEs at a radio resource control layer (RRC).

In another optional manner, the signal forwarding device A may further combine uplink signals of the plurality of subordinate UEs at a media access control layer (MAC).

Compared with a repeater (a signal processing process of the repeater is similar to that of the base station, and needs multi-layer protocol conversion) in the existing technologies, the signal forwarding device A in this embodiment of this application provides a relatively simple signal processing manner of skipping performing multi-layer protocol conversion, so that a signal can be processed at the MAC layer or the RRC layer, thereby reducing system overheads.

Figure 4:
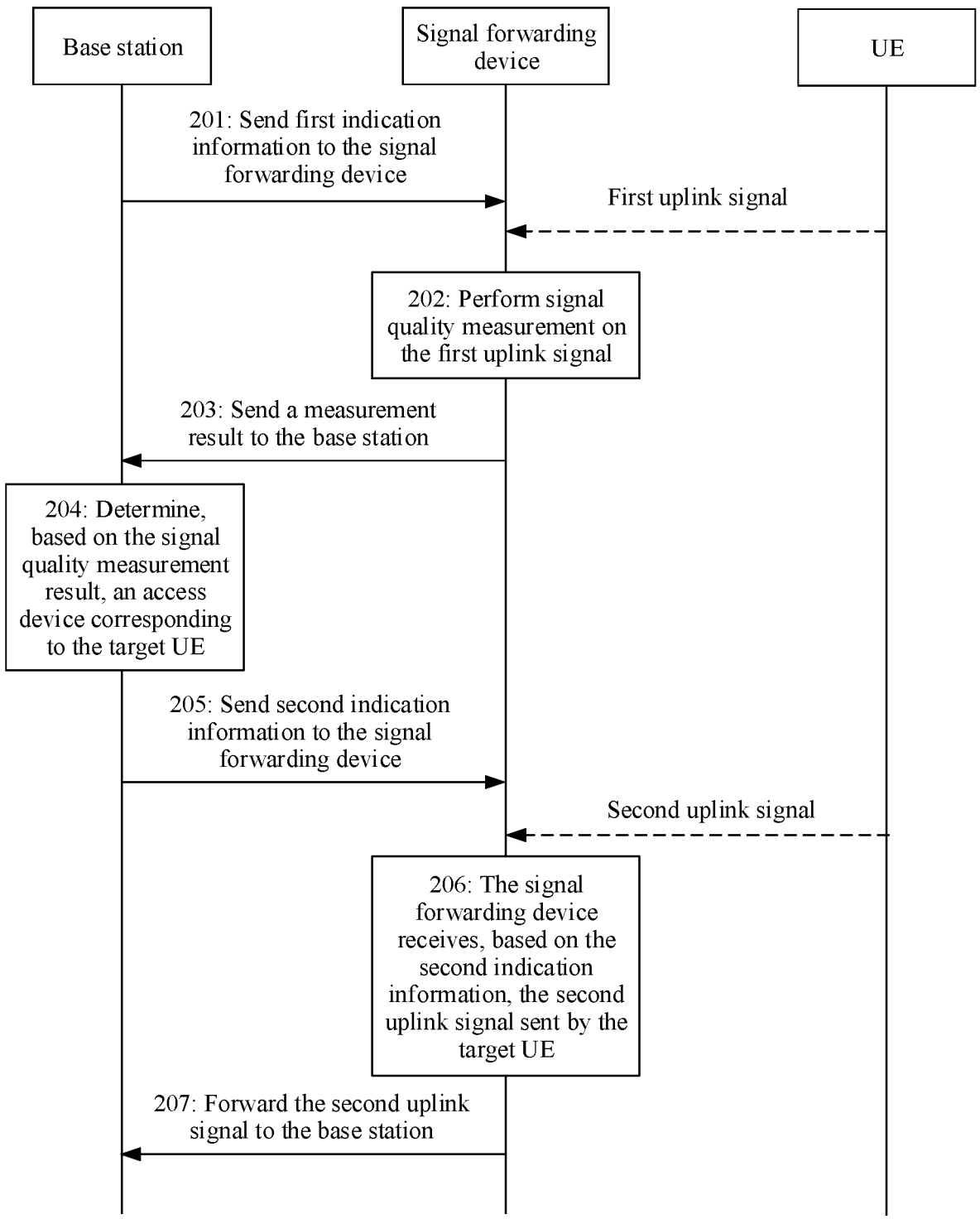
FIG. 4 is a first flowchart of a signal processing method according to an embodiment of this application.

FIG. 4 is a schematic flowchart of a signal processing method according to an embodiment of this application. This embodiment is mainly used to describe in detail a signal processing process of the foregoing second type: the UE that accesses the base station by using the signal forwarding device. In FIG. 4:

Step 201: A base station sends first indication information to a signal forwarding device.

Specifically, in this embodiment, the base station may send the first indication information to the signal forwarding device, to indicate the signal forwarding device to perform, based on a measurement parameter carried in the first indication information, signal quality measurement on an uplink signal of target UE.

With reference to FIG. 1, in this embodiment, an example in which the base station allocates UE 2 to a signal forwarding device A is described in detail. It may also be understood that, in an access process of the UE 2, when step 104 is performed, the base station allocates the UE 2 to the signal forwarding device A.

In an optional manner, the first indication information sent by the base station may further carry measurement periodicity information, that is, indicate the signal forwarding device A to perform, at a measurement periodicity trigger moment, signal quality measurement on an uplink signal of the UE 2 based on a measurement parameter of the UE 2.

In an optional manner, the base station side may set a measurement periodicity. In this case, the base station side sends, to the signal forwarding device A at the measurement periodicity trigger moment, measurement parameters of all UEs that include the UE 2 and that are allocated to the signal forwarding device A as subordinate UEs, to indicate the signal forwarding device to perform the signal quality measurement for the subordinate UEs.

In addition, when indicating the signal forwarding device A to perform the signal quality measurement for the UE 2, the base station may indicate the signal forwarding device B to perform the signal quality measurement for the UE 2, so that an optimal signal forwarding device can still be allocated to the UE after a location of the UE moves.

Step 201 is similar to step 101, and details are not described herein again. Different from step 101, the measurement parameter in step 101 is a measurement parameter configured for an access request. However, the UE in this embodiment is UE that has accessed the base station by using the signal forwarding device A. Therefore, a second uplink signal sent by the UE 2 may be an uplink data signal or an uplink control signal, and the measurement parameter that corresponds to the UE 2 and that is sent by the base station to the signal forwarding device A and/or the signal forwarding device B includes but is not limited to related information of an SRS and/or a DMRS.

Step 202: The signal forwarding device receives a first uplink signal of the target UE based on the measurement parameter, and performs signal quality measurement on the first uplink signal.

This step is similar to step 101, and details are not described herein again.

Step 203: The signal forwarding device sends a measurement result to the base station.

Specifically, the base station indicates the one or more signal forwarding devices that perform signal quality measurement for the target UE to send signal quality measurement results to the base station. For specific details, refer to step 103. Details are not described herein again.

Step 204: The base station determines, based on the signal quality measurement result, an access device corresponding to the target UE.

Specifically, in this embodiment, the base station may allocate a corresponding signal forwarding device to the target UE based on measurement results that are for the target UE and that are sent by the one or more signal forwarding devices. With reference to FIG. 1, for example, if the base station still determines to allocate the UE 2 to the signal forwarding device A, the signal forwarding device A continues to process another uplink signal of the UE 2. If the base station allocates the UE 2 to the signal forwarding device B, the signal forwarding device B continues to process another uplink signal of the UE 2.

For other details, refer to step 104. Details are not described herein again.

Step 205: The base station sends second indication information to the signal forwarding device.

This step is similar to step 105, and details are not described herein again.

Step 206: The signal forwarding device receives, based on the second indication information, the second uplink signal sent by the target UE.

This step is similar to step 106, and details are not described herein again.

Step 207: The signal forwarding device forwards the second uplink signal to the base station.

This step is similar to step 107, and details are not described herein again.

Figure 5:
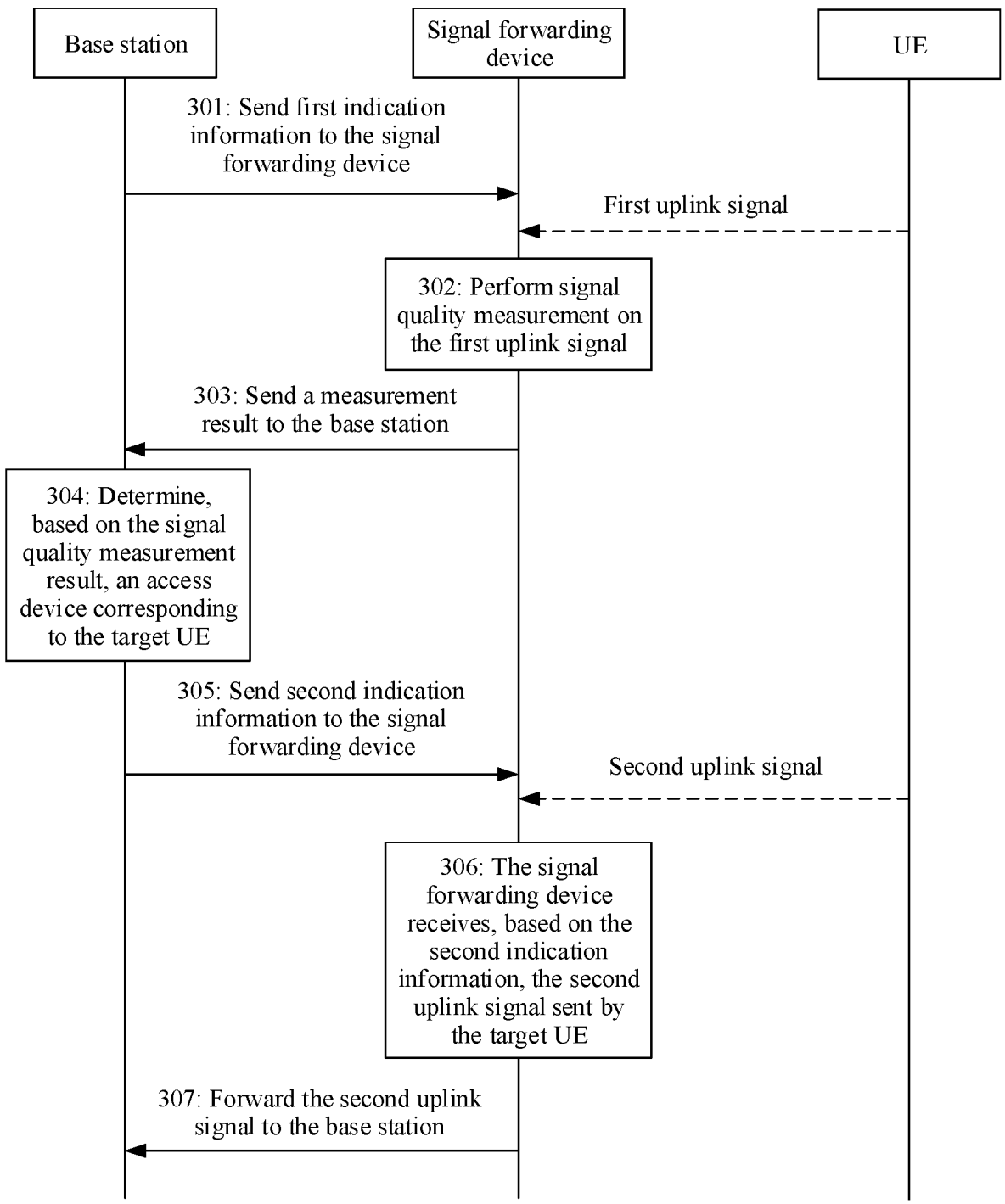
FIG. 5 is a first flowchart of a signal processing method according to an embodiment of this application.

FIG. 5 is a schematic flowchart of a signal processing method according to an embodiment of this application. This embodiment is mainly used to describe in detail a signal processing process of the foregoing third type: the UE that directly accesses the base station. In FIG. 5:

Step 301: A base station sends first indication information to a signal forwarding device.

In an optional manner, the base station side may configure a measurement periodicity. To be specific, the base station periodically sends, to one or more signal forwarding devices that communicate with the base station, the first indication information that carries a measurement parameter of target UE, to indicate the one or more signal forwarding devices to perform signal quality measurement for the target UE.

In another optional manner, the first indication information sent by the base station may further carry measurement periodicity information, that is, indicate the one or more signal forwarding devices to perform, at a measurement periodicity trigger moment, signal quality measurement on an uplink signal of the target UE based on the measurement parameter of the target UE.

In still another optional manner, the base station may alternatively send the first indication information to the one or more signal forwarding devices when detecting that signal quality of the target UE deteriorates.

It should be noted that the measurement periodicity in this embodiment may be longer than the measurement periodicity in step 201, to reduce device pressure of the signal forwarding device.

With reference to FIG. 1, for example, UE 3 is used as UE that directly accesses a base station. That is, in an access process of the UE 3, after step 104, the base station allocates the UE 3 to the base station as subordinate UE of the base station.

Step 301 is similar to step 101, and details are not described herein again. Different from step 101, the measurement parameter in step 101 is a measurement parameter configured for an access request. However, the UE in this embodiment is UE that has accessed the base station by using the signal forwarding device A. Therefore, a second uplink signal sent by the UE 2 may be an uplink data signal or an uplink control signal, and the measurement parameter that corresponds to the UE 2 and that is sent by the base station to the signal forwarding device A and/or the signal forwarding device B includes but is not limited to related information of an SRS and/or a DMRS.

Step 302: The signal forwarding device receives a first uplink signal of the target UE based on the measurement parameter, and performs signal quality measurement on the first uplink signal.

This step is similar to step 101, and details are not described herein again.

Step 303: The signal forwarding device sends a measurement result to the base station.

Specifically, the base station indicates the one or more signal forwarding devices that perform signal quality measurement for the target UE to send signal quality measurement results to the base station. For specific details, refer to step 103. Details are not described herein again.

Step 304: The base station determines, based on the signal quality measurement result, an access device corresponding to the target UE.

Specifically, in this embodiment, the base station may allocate a corresponding signal forwarding device to the target UE based on measurement results that are for the target UE and that are sent by the one or more signal forwarding devices. With reference to FIG. 1, for example, if the base station determines to allocate UE 3 to the signal forwarding device A, step 205 is performed, that is, the signal forwarding device A continues to process another uplink signal of the UE 3. If the base station determines to use the UE 3 as subordinate UE of the base station, the base station continues to process an uplink signal of the UE 3.

For other details, refer to step 104. Details are not described herein again.

Step 305: The base station sends second indication information to the signal forwarding device.

This step is similar to step 105, and details are not described herein again.

Step 306: The signal forwarding device receives, based on the second indication information, the second uplink signal sent by the target UE.

This step is similar to step 106, and details are not described herein again.

Step 307: The signal forwarding device forwards the second uplink signal to the base station.

This step is similar to step 107, and details are not described herein again.

In conclusion, in the technical solutions in the embodiments of this application, the base station may indicate the signal forwarding device to perform signal quality measurement for the target UE, and the base station may compare a signal quality measurement result of the target UE obtained by the base station with a measurement result reported by the signal forwarding device, to select an optimal signal forwarding device for the target UE, that is, a signal forwarding device with optimal transmission quality between the target UE and the target UE. Therefore, the base station can monitor the signal forwarding device corresponding to the target UE, or subordinate UE of each signal forwarding device, to facilitate management and improve system reliability and overall performance.

In addition, in an optional manner, the signal forwarding device may be further configured to forward downlink signals sent by the base station to all UEs that access the base station. Specifically, the signal forwarding device receives all downlink signals sent by the base station. Then, the signal forwarding device may perform processing such as low noise amplification, frequency selection, and amplification on the downlink signals, and forward the amplified downlink signals. For example, the signal forwarding device A monitors downlink signals (including a downlink signal sent to the UE 1, a downlink signal sent to the UE 2, and/or a downlink signal sent to the UE 3) delivered by the base station, the signal forwarding device A processes the downlink signals (for specific processing details, refer to an existing technical embodiment, and details are not described in this application), to amplify the downlink signals. Then, the signal forwarding device A forwards the amplified downlink signals. The UE 1 to the UE 3 may monitor respective downlink channels based on channel identification information of the UE 1 to the UE 3, and obtain respective downlink signals.

In an optional manner, the base station may further send update information to the signal forwarding device, to indicate the signal forwarding device to update the configuration of the signal forwarding device. The update information includes but is not limited to upgrade information, restart information, or the like.

The foregoing mainly describes the solutions provided in the embodiments of this application from a perspective of interaction between network elements. It may be understood that, to implement the foregoing functions, the base station and the signal forwarding device include corresponding hardware structures and/or software modules for performing the functions. A person skilled in the art should easily be aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement a described function for each particular application, but it should not be considered that the implementation goes beyond the scope of this application.

In the embodiments of this application, function module division may be performed on the wireless signal coverage detection apparatus based on the foregoing method example. For example, each function module corresponding to each function may be obtained through division, or two or more functions may be integrated into one processing module. The integrated module may be implemented in a form of hardware, or may be implemented in a form of a software function module. It should be noted that, in the embodiments of this application, division into modules is an example, and is merely logical function division. During actual implementation, another division manner may be used.

Figure 6:
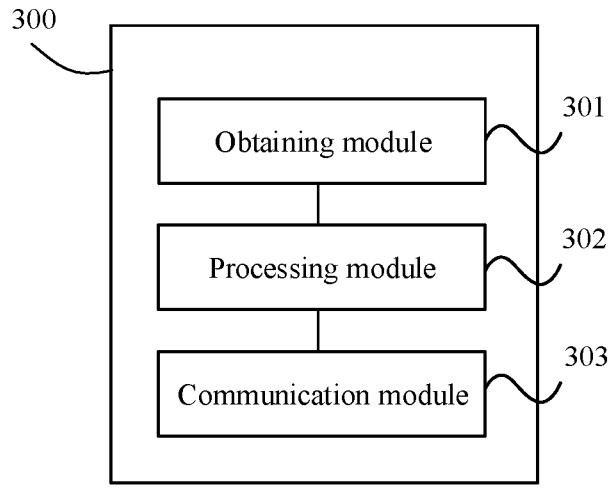
FIG. 6 is a schematic block diagram of a signal forwarding device according to an embodiment of this application.

The following describes a signal forwarding device provided in an embodiment of this application. FIG. 6 is a schematic structural diagram of the signal forwarding device in this embodiment of this application. In FIG. 6:

The signal forwarding device 300 may include an obtaining module 301, a processing module 302, and a communication module 303. The obtaining module 301 may be configured to perform a step of "obtaining indication information (including first indication information, second indication information, third indication information, and/or fourth indication information) from a downlink signal (including a downlink signal sent to UE and/or a downlink signal sent to the signal forwarding device) sent by a base station". The processing module 302 may be configured to perform a step of "performing signal quality measurement on an uplink signal of the UE". The communication module 303 may include a first communication module 3031. The module may be configured to support communication between the signal forwarding device and the base station, for example, support the signal forwarding device in performing a step of "processing and forwarding the downlink signal", and may be further configured to support the signal forwarding device in performing the step of "sending the uplink signal to the base station". The communication module 303 may further include a second communication module 3032. The module may be configured to support communication between the signal forwarding device and the UE, for example, support the signal forwarding device in performing a step of "receiving the uplink signal of the UE", and may be further configured to support the signal forwarding device in performing a step of "sending the downlink signal to the UE".

Figure 7:
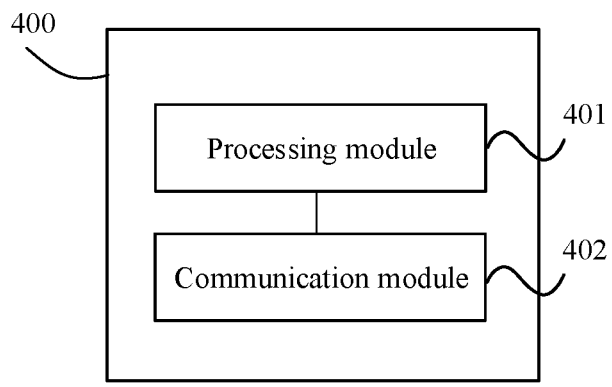
FIG. 7 is a schematic block diagram of a base station according to an embodiment of this application.

FIG. 7 is a schematic block diagram of a base station according to an embodiment of this application. In FIG. 7:

The base station 400 may include a processing module 401 and a communication module 402. The processing module 401 may be configured to perform a step of "performing signal quality measurement on an uplink signal of UE" and a step of "allocating a corresponding signal forwarding device to target UE based on a measurement result". The communication module 402 may be configured to receive or send instructions or data. For example, the communication module 402 may be configured to perform steps of "sending a downlink signal to the UE" and "sending a downlink signal to the signal forwarding device", and may be further configured to perform steps of "receiving an uplink signal sent by the UE" and "receiving an uplink signal sent by the signal forwarding device", and a step of "sending indication information to the signal forwarding device".

Figure 8:
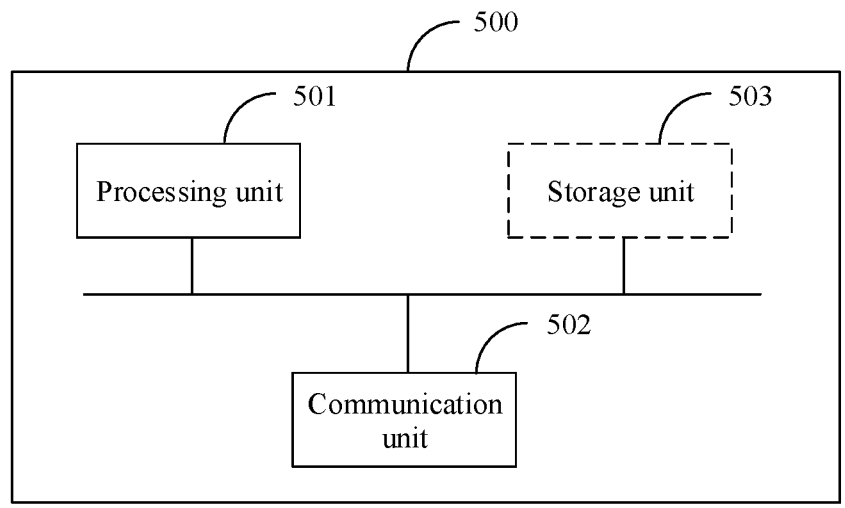
FIG. 8 is a schematic structural diagram of an apparatus according to an embodiment of this application.

The following describes an apparatus provided in an embodiment of this application. As shown in FIG. 8, the apparatus includes a processing unit 501 and a communication unit 502. Optionally, the apparatus further includes a storage unit 503. The processing unit 501, the communication unit 502, and the storage unit 503 are connected by using a communication bus.

The communication unit 502 may be an apparatus that has a transceiver function, and is configured to communicate with another network device or a communication network.

The storage unit 503 may include one or more memories. The memory may be a component configured to store a program or data in one or more devices or circuits.

The storage unit 503 may exist independently, and is connected to the processing unit 501 by using the communication bus. The storage unit may alternatively be integrated with the processing unit 501.

The apparatus 500 may be used in a network device, a circuit, a hardware component, or a chip.

The apparatus 500 may be a signal forwarding device in the embodiments of this application, for example, a signal forwarding device A or a signal forwarding device B. A schematic diagram of the signal forwarding device may be shown in FIG. 2b. Optionally, the communication unit 502 of the apparatus 500 may include an antenna and a transceiver of the terminal, for example, the antenna 206 and the transceiver 202 in FIG. 2b.

The apparatus 500 may be a chip in the signal forwarding device in the embodiments of this application. The communication unit 502 may be an input or output interface, a pin, a circuit, or the like. Optionally, the storage unit may store computer-executable instructions of the method on a terminal side, to enable the processing unit 501 to execute the method on the signal forwarding device side in the foregoing embodiments. The storage unit 503 may be a register, a cache, a RAM, or the like, and the storage unit 503 may be integrated with the processing unit 501. The storage unit 503 may be a ROM or another type of static storage device that may store static information and instructions, and the storage unit 503 may be independent of the processing unit 501. Optionally, with development of wireless communication technologies, a transceiver may be integrated into the apparatus 500. For example, the communication unit 502 integrates the transceiver 202.

When the apparatus 500 is the signal forwarding device in the embodiments of this application or the chip in the signal forwarding device, the apparatus 500 may implement the method performed by the signal forwarding device in the foregoing embodiments. For details, refer to related content in FIG. 3, FIG. 4, and FIG. 5. Details are not described herein again.

The apparatus 500 may be the base station in the embodiments of this application. A schematic diagram of the base station may be shown in FIG. 2a. Optionally, the communication unit 502 of the apparatus 500 may include an antenna and a transceiver of the base station, for example, the antenna 105 and the transceiver 103 in FIG. 2a. The communication unit 502 may further include a network interface of the base station, for example, the network interface 104 in FIG. 2a.

The apparatus 500 may be a chip in the base station in the embodiments of this application. The communication unit 502 may be an input or output interface, a pin, a circuit, or the like. Optionally, the storage unit may store computer-executable instructions of the method on the base station side, to enable the processing unit 501 to execute the method on the base station side in the foregoing embodiments. The storage unit 503 may be a register, a cache, a RAM, or the like, and the storage unit 503 may be integrated with the processing unit 501. The storage unit 503 may be a ROM or another type of static storage device that may store static information and instructions. The storage unit 503 may be independent of the processing unit 501. Optionally, with development of wireless communication technologies, a transceiver may be integrated into the apparatus 500. For example, the communication unit 502 integrates the transceiver 103, and the network interface 104.

When the apparatus 500 is the base station or the chip in the base station in the embodiments of this application, the method performed by the base station in the foregoing embodiments may be implemented. For details, refer to related content in FIG. 3, FIG. 4, and FIG. 5. Details are not described herein again.

An embodiment of this application further provides a computer-readable storage medium. The methods described in the foregoing embodiments may be all or partially implemented by using software, hardware, firmware, or any combination thereof. If the methods are implemented in software, functions used as one or more instructions or code may be stored in or transmitted on the computer-readable medium. The computer-readable medium may include a computer storage medium and a communication medium, and may further include any medium that can transfer a computer program from one place to another. The storage medium may be any available medium accessible to a computer.

In an optional design, the computer-readable medium may include a RAM, a ROM, an EEPROM, a CD-ROM or another optical disc storage, a magnetic disk storage or another magnetic storage device, or any other medium that can be configured to carry or store required program code in a form of instructions or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and a microwave) are used to transmit software from a website, a server, or another remote source, the coaxial cable, the optical fiber cable, the twisted pair, the DSL or the wireless technologies such as infrared, radio, and a microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing embodiments may be all or partially implemented by using software, hardware, firmware, or any combination thereof. When the methods are implemented by software, the methods may be all or partially implemented in a form of a computer program product. The computer program product includes one or more computer instructions. When the foregoing computer program instructions are loaded and executed on a computer, the procedures or functions described in the foregoing method embodiments are all or partially generated. The foregoing computer may be a general-purpose computer, a dedicated computer, a computer network, a network device, user equipment or other programmable apparatuses.

The foregoing describes the embodiments of this application with reference to the accompanying drawings. However, this application is not limited to the foregoing specific implementations. The foregoing specific implementations are merely examples, and are not limitative. Inspired by this application, a person of ordinary skill in the art may further make many modifications without departing from the purposes of this application and the protection scope of the claims, and all the modifications shall fall within the protection scope of this application.

What is claimed is:

1. A signal processing method, comprising:
   obtaining, by a signal forwarding device, first indication information, wherein the first indication information comprises a measurement parameter for measuring access request;
   performing, by the signal forwarding device based on the measurement parameter, signal quality measurement on a received access request sent by a target user equipment (UE) to obtain a signal quality measurement result;
   sending, by the signal forwarding device, the signal quality measurement result to a base station; and
   after obtaining second indication information sent by the base station, receiving, by the signal forwarding device, a second uplink signal sent by the target UE, and forwarding the second uplink signal to the base station, wherein the second indication information is sent by the base station to the signal forwarding device, after the base station determines, based on the signal quality measurement result, to allocate the target UE to the signal forwarding device as subordinate UE.

2. The method according to claim 1, wherein the first indication information or the second indication information is comprised in a first downlink channel between the base station and the signal forwarding device.

3. The method according to claim 1, wherein the second indication information is comprised in a second downlink channel between the base station and the target UE, and the obtaining or the second indication information by the signal forwarding device comprises:
   monitoring the second downlink channel based on third indication information sent by the base station, to obtain the second indication information, wherein the third indication information carries identification information that indicates the second downlink channel.

4. The method according to claim 1, wherein the second indication information comprises a reception control parameter, and the reception control parameter indicates the signal forwarding device to identify and obtain the second uplink signal.

5. The method according to claim 1, wherein the method further comprises:
   receiving, by the signal forwarding device, downlink signals sent by the base station;
   amplifying, by the signal forwarding device, the downlink signals; and
   forwarding, by the signal forwarding device, the amplified downlink signals.

6. The method according to claim 1, wherein the method further comprises:
   obtaining, by the signal forwarding device, fourth indication information, wherein the fourth indication information comprises a transmit parameter; and wherein the forwarding the second uplink signal to the base station comprises:
   transmitting, by the signal forwarding device, the second uplink signal to the base station based on the transmit parameter.

7. A signal forwarding device, comprising
   at least one hardware processor; and
   one or more non-transitory computer-readable storage media coupled to the at least one hardware processor and storing programming instructions for execution by the at least one hardware processor, wherein the programming instructions, when executed, cause the device to perform operations comprising:

obtaining first indication information, wherein the first indication information comprises a measurement parameter for measuring access request;

performing, based on the measurement parameter, signal quality measurement on a received access request sent by a target user equipment (UE) to obtain a signal quality measurement result;

sending the signal quality measurement result to a base station; and after obtaining second indication information sent by the base station, receiving a second uplink signal sent by the target UE, and forwarding the second uplink signal to the base station, wherein the second indication information is sent by the base station to the signal forwarding device, after the base station determines, based on the signal quality measurement result, to allocate the target UE to the signal forwarding device as subordinate UE.

8. The signal forwarding device according to claim 7, wherein the first indication information or the second indication information is comprised in a first downlink channel between the base station and the signal forwarding device.

9. The signal forwarding device according to claim 7, wherein the second indication information is comprised in a second downlink channel between the base station and the target UE, and the obtaining the second indication information comprises:

monitoring the second downlink channel based on third indication information sent by the base station, to obtain the second indication information, wherein the third indication information carries identification information that indicates the second downlink channel.

10. The signal forwarding device according to claim 7, wherein the second indication information comprises a reception control parameter, and the reception control parameter indicates the signal forwarding device to identify and obtain the second uplink signal.

11. The signal forwarding device according to claim 7, wherein the operations comprise:

receiving downlink signals sent by the base station;
amplifying the downlink signals; and
forwarding the amplified downlink signals.

12. The signal forwarding device according to claim 7, wherein the operations comprise:

obtaining fourth indication information, wherein the fourth indication information comprises a transmit parameter; and wherein the forwarding the second uplink signal to the base station comprises:

transmitting the second uplink signal to the base station based on the transmit parameter.

13. A base station, comprising
at least one hardware processor; and
one or more non-transitory computer-readable storage media coupled to the at least one hardware processor and storing programming instructions for execution by the at least one hardware processor, wherein the programming instructions, when executed, cause the base station to perform operations comprising:

sending first indication information to a first signal forwarding device, wherein the first indication information comprises a measurement parameter for measuring access request;

receiving a first signal quality measurement result sent by the first signal forwarding device, wherein the first signal quality measurement result comprises signal quality measurement result of an access request of a target user equipment (UE);

obtaining the access request;

performing signal quality measurement on the access request to obtain a second signal quality measurement result;

determining, based on the first signal quality measurement result and the second signal quality measurement result, whether to allocate the target UE to the first signal forwarding device as subordinate UE;

in response to determining to allocate the target UE to the first signal forwarding device as the subordinate UE, sending second indication information to the first signal forwarding device, wherein the second indication information indicates the first signal forwarding device to further receive a second uplink signal sent by the target UE; and receiving the second uplink signal sent by the first signal forwarding device.

14. The base station according to claim 13, wherein the sending first indication information to a first signal forwarding device comprises:

sending the first indication information to at least one second signal forwarding device; and the operations comprise:

receiving a third signal quality measurement result sent by each second signal forwarding device in the at least one second signal forwarding device; and determining, based on the first signal quality measurement result, the second signal quality measurement result, and the third signal quality measurement result, whether to allocate the target UE to the first signal forwarding device as the subordinate UE.

15. The base station according to claim 13, wherein the first indication information or the second indication information is comprised in a first downlink channel between the base station and the first signal forwarding device.

16. The base station according to claim 13, wherein the sending second indication information to the first signal forwarding device comprises:

sending third indication information to the first signal forwarding device, wherein the third indication information indicates the first signal forwarding device to monitor a second downlink channel between the base station and the target UE, and obtain the second indication information comprised in the second downlink channel.

17. The base station according to claim 13, wherein the second indication information comprises a reception control parameter, and the reception control parameter indicates the first signal forwarding device to identify and obtain the second uplink signal.

18. The base station according to claim 13, wherein the operations comprise:

sending fourth indication information to the first signal forwarding device, wherein the fourth indication information comprises a transmit parameter, and the transmit parameter indicates the first signal forwarding device to transmit the second uplink signal to the base station based on the transmit parameter.

* * * * *